United States Patent
Kulesh et al.

(10) Patent No.: US 12,449,515 B2
(45) Date of Patent: Oct. 21, 2025

(54) TIME OF FLIGHT CALCULATION WITH INTER-BIN DELTA ESTIMATION

(71) Applicant: NXP B.V., Eindhoven (NL)

(72) Inventors: Maxim Kulesh, Hamburg (DE); Sebastián André Fatjó Carvajal, Leuven (BE); Mark Steigemann, Ebstorf (DE)

(73) Assignee: NXP B.V., Eindhoven (NL)

( * ) Notice: Subject to any disclaimer, the term of this patent is extended or adjusted under 35 U.S.C. 154(b) by 1036 days.

(21) Appl. No.: 17/451,685

(22) Filed: Oct. 21, 2021

(65) Prior Publication Data

US 2022/0187430 A1   Jun. 16, 2022

(30) Foreign Application Priority Data

Dec. 16, 2020 (EP) ..................................... 20214530

(51) Int. Cl.
*G01S 7/4865* (2020.01)
*G01S 7/48* (2006.01)
*G01S 7/4863* (2020.01)

(52) U.S. Cl.
CPC .......... *G01S 7/4865* (2013.01); *G01S 7/4808* (2013.01); *G01S 7/4863* (2013.01)

(58) Field of Classification Search
None
See application file for complete search history.

(56) References Cited

U.S. PATENT DOCUMENTS

| | | | |
|---|---|---|---|
| 9,502,458 B2 | 11/2016 | Parmesan | |
| 10,571,570 B1* | 2/2020 | Paulsen | G01S 17/10 |
| 2017/0052065 A1 | 2/2017 | Sharma et al. | |
| 2020/0233066 A1 | 7/2020 | Kulesh et al. | |
| 2022/0350001 A1* | 11/2022 | Sakakibara | G01S 17/14 |

OTHER PUBLICATIONS

Fatjo Carvajal, S., "Development and analysis of signal processing flow for LiDAR based on SPAD receiver architecture for automotive application", Master Thesis, University of Kaiserslautern, Nov. 22, 2019.

(Continued)

*Primary Examiner* — Hovhannes Baghdasaryan (57) ABSTRACT

The disclosure relates to time of flight calculations for a lidar transceiver. Example embodiments include a method of calculating time of flight of a lidar signal, the method comprising: i) transmitting a light pulse to start (502) an acquisition time period having a plurality of successive time portions; ii) for each successive time portion, if a photon is received (503): iia) recording (505) a time at which the photon is received; iib) updating (504) a histogram to record a cumulative count of photons received during the time portion; iic) calculating (505) a time difference between the time at which the photon is received relative to a reference point of the time portion; iid) updating (506) a cumulative total of the calculated time difference for the time portion; iii) repeating steps i) to iid) for a succession of N transmitted light pulses; iv) identifying (509) a peak in a time portion of the histogram; and v) estimating (510) a time of flight from the cumulative total of the calculated time difference for the time portion of the histogram containing the identified peak.

17 Claims, 7 Drawing Sheets

(56) References Cited

OTHER PUBLICATIONS

Hutchings, S., "A Reconfigurable 3-D-Stacked SPAD Imager With In-Pixel Histogramming for Flash LIDAR or High-Speed Time-of-Flight Imaging", IEEE Journal of Solid-State Circuits, vol. 54, Issue 11, Sep. 25, 2019.
Vornicu, I., "Compact Real-Time Inter-Frame Histogram Builder for 15-Bits High-Speed ToF-Images Based on Single-Photon Detection", IEEE Sensors Journal, vol. 19, No. 6, Mar. 15, 2019.
Zhang, C., "A CMOS SPAD Imager with Collision Detection and 128 Dynamically Reallocating TDCs for Single-photon Counting and 3D Time-of-flight Imaging", Sensors 18.11 (2018): 4016, Nov. 17, 2018.

\* cited by examiner

Fig. 3C a) Bin = 1xLSB

Fig. 4A b) Bin = 8xLSB

Fig. 4B c) Bin = 64xLSB

Fig. 4C

Fig. 5 a) Bin = 8xLSB   Fig. 6A b) Bin = 64xLSB   Fig. 6B

TIME OF FLIGHT CALCULATION WITH INTER-BIN DELTA ESTIMATION

CROSS-REFERENCE TO RELATED APPLICATIONS

This application claims the priority under 35 U.S.C. § 119 of European Patent application no. 20214530.6, filed on 16 Dec. 2020, the contents of which are incorporated by reference herein.

FIELD

The disclosure relates to time of flight calculations for a lidar transceiver.

BACKGROUND

Lidar (light detection and ranging) has an important role for autonomous vehicles due to its high range and angular resolution. Receivers based on Single-Photon Avalanche Photodiodes (SPADs) are promising for automotive lidar applications due to their high sensitivity, high time resolution and high array resolution enabled by planar device structure (e.g. CMOS SPAD).

SPADs have a proven record of time-of-flight in time-correlated single photon counting (TCSPC) configuration for short range and low noise applications, such as fluorescence lifetime microscopy. Typically, SPAD pixels are connected to time-to-digital converters (TDC) for time-of-flight estimation. Due to internal and external noise, as well as the probabilistic nature of single-photon operation mode, one acquisition cycle typically comprises multiple time-of-flight measurements and a true signal is identified statistically. Adapting the use of SPADs to accommodate long range noise in automotive lidar applications requires a substantial redefinition of the architecture. A typical processing flow for lidar applications involves constructing a timestamp histogram and identifying a target reflection by identifying a peak in the histogram. Such an approach involves a trade-off between resolution and memory requirements because a smaller bin width results in a higher resolution but requires more memory capacity. Memory may be very limited in embedded automotive applications, putting a limit on resolution achieved via this route. Existing solutions may involve splitting a complete acquisition cycle into multiple steps, involving course resolution steps followed by finer resolution steps to zoom into a region of interest. In this way a lower number of bins may be used at each step. A disadvantage of this approach is that the number of measurement available is split between steps, effectively lowering the signal-to-noise ratio (SNR). As the result the sensitivity is reduced, since compressed data from any step cannot be carried over to the next step.

SUMMARY

According to a first aspect there is provided a method of calculating time of flight of a lidar signal, the method comprising:
 i) transmitting a light pulse to start an acquisition time period having a plurality of successive time portions;
 ii) for each successive time portion, if a photon is received:
  iia) recording a time at which the photon is received;
  iib) updating a histogram to record a cumulative count of photons received during the time portion;
  iic) calculating a time difference between the time at which the photon is received relative to a reference point of the time portion;
  iid) updating a cumulative total of the calculated time difference for the time portion;
 iii) repeating steps i) to iid) for a succession of N transmitted light pulses;
 iv) identifying a peak in a time portion of the histogram; and
 v) estimating a time of flight from the cumulative total of the calculated time difference for the time portion of the histogram containing the identified peak.

The addition of cumulative delta or phase to the range estimation method allows the implementation of wider histogram bins without this meaning a significant loss in the accuracy of the measurements, thereby allowing a substantial reduction of memory requirements without a corresponding sacrifice of sensitivity and range resolution. The method also allows for the point of maximum photon events concentration within one or more histogram bins to be determined, disregarding the bin width, making it possible to estimate the range to a target with a higher precision. Intra-bin cumulative delta or phase value can be shared between group of bins or the compete histogram for further memory reduction. Other data, such as second central moment of timestamps, may provide more useful information, such as material or relative orientation, without implying additional post-processing on the full histogram. A second central moment of an identified peak may be obtained from a sum of squares of the calculated time differences, for example by calculating a root mean square value from the cumulative total of time differences.

The cumulative total of the calculated time difference may be combined for multiple time portions over the acquisition time period, which reduces the memory requirement further. Combining the cumulative total over multiple bins does not result in a loss of accuracy because noise will on average cancel out for bins having no peak over a background noise level.

The cumulative total of the calculated time difference may be applied to the reference time of the portion of the histogram containing the identified peak by dividing the cumulative total of the calculated time difference by the cumulative count of photons received during the time portion containing the identified peak. In other words, an average may be determined from the cumulative total that is used to estimate the time of flight.

A measure of noise may be subtracted from the cumulative count of photons received during the time portion containing the identified peak.

The reference point of the time portion may be at a mid-point of the time portion.

The time of flight, t, for the identified peak may be calculated from:

$$t = t_r + \frac{\sum \Delta}{H_i - H_{noise}}$$

where $t_r$ is a time from the start of the acquisition time period corresponding to reference point of the time portion, $\Sigma\Delta$ is the cumulative total of the calculated time difference, $H_i$ is the cumulative count of photons and $_{Noise}$) is a measure of noise in the histogram. \x\to(H The measure of noise, $_{Noise}$), may be calculated from an average of photon counts across the histogram other than the time portion containing the peak.\x\to(H According to a second aspect there is provided a lidar transceiver comprising:
  a transmitter configured to transmit light pulses;
  a receiver configured to receive reflected photons from the light pulses transmitted by the transmitter; and
  processing circuitry connected to the transmitter and receiver, the processing circuitry configured to:
  i) start an acquisition time period by causing the transmitter to transmit a light pulse;
  ii) for a plurality of successive time portions in the acquisition time period, if a photon is received:
  iia) record a time at which the photon is received;
  iib) update a histogram to record a cumulative count of photons received by the receiver during the time portion;
  iic) calculate a time difference between the time at which the photon is received relative to a reference point of the time portion;
  iid) update a cumulative total of the calculated time difference for the time portion;
  iii) repeat steps i) to iid) for a succession of N transmitted light pulses;
  iv) identify a peak in a time portion of the histogram; and
  v) estimate a time of flight from the cumulative total of the calculated time difference for the time portion of the histogram containing the identified peak.

The cumulative total of the calculated time difference may be combined for multiple time portions over the acquisition time period.

The receiver may be a single photon avalanche diode. The receiver may comprise an array of single photon avalanche diodes, the processor being configured to perform steps i) to v) for each single photon avalanche diode in the array in parallel.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Disclosed herein in general terms is a method and apparatus that separates peak detection and range estimation into two parallel processes. Wide-bin histogram bins can be used for target detection, thereby reducing memory requirements. Additional inter-bin cumulative delta or phase values per bin, group of bins or the complete histogram are estimated in real time for more accurate range estimation, thus achieving resolution and/or accuracy higher than would otherwise be imposed by the bin width of a histogram. The inter-bin cumulative delta or phase may be a real-time sum of timestamps relative to a reference point of each histogram bin, for example the bin middle, or in other words the phase relative to the reference. The technique leverages the fact that the total contribution from external noise (such as sunlight) and internal noise (the so called dark count rate) to inter-bin cumulative delta or phase value will tend to cancel out because the noise within a single laser shot is largely uniform. Changing noise between laser shots, or slowly shifting noise, will not result in clutter-edges (abrupt noise changes) observable in the histogram.

The characteristics of a true signal can be extracted by analysing a cumulative inter-bin delta or phase value, the bin count of corresponding bin, together with a measured noise level. For example, a peak location of a reflected signal can be estimated by dividing the final cumulative delta value by the bin count excluding noise counts, which can be approximated using available noise statistics, e.g. bin counts for other non-target bins. In a similar manner, more data, such as second central moment of timestamp, can be gathered, and may provide more information about the signal, e.g. material or relative orientation.

Figure 1:
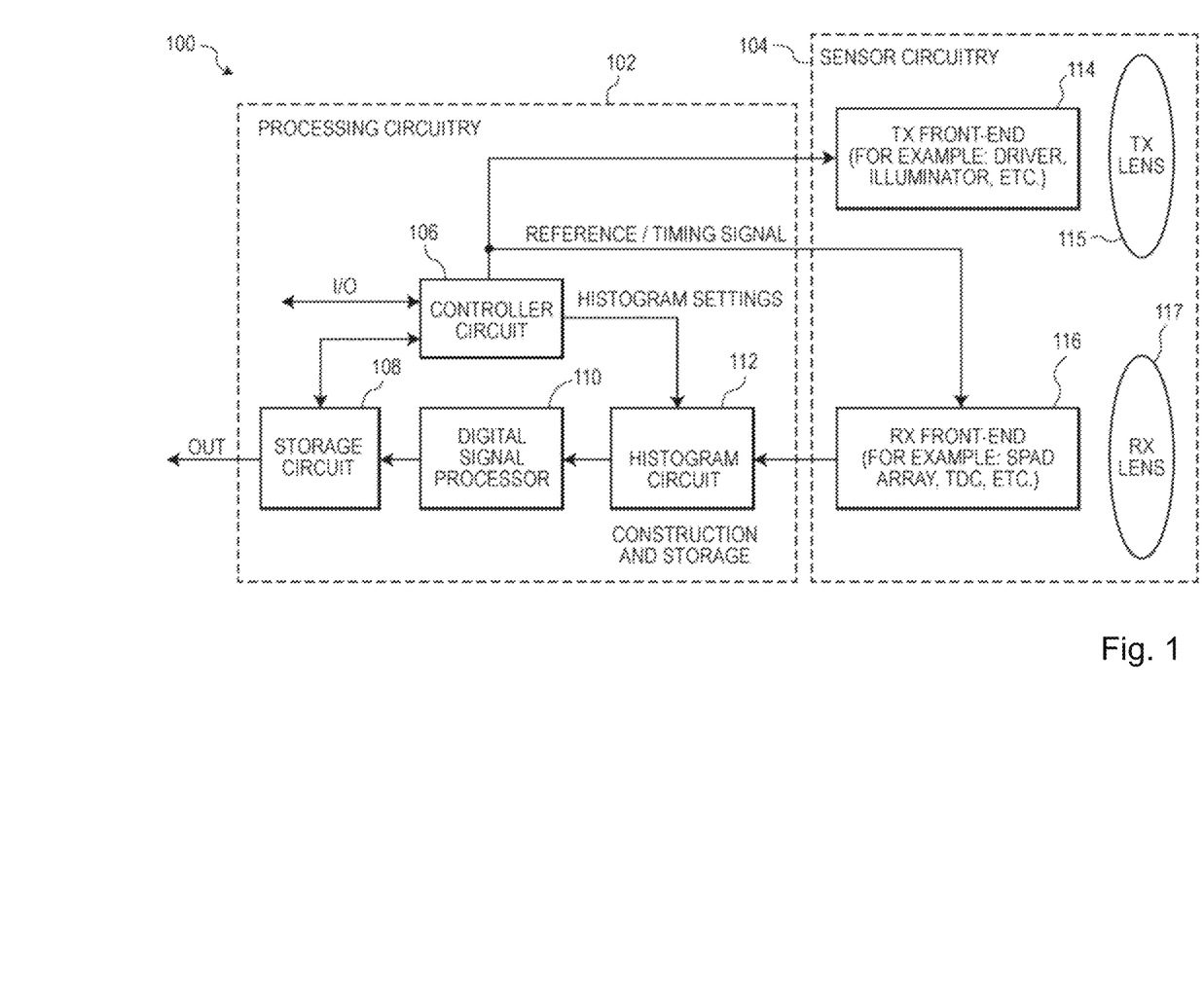
FIG. 1 illustrates an example of an apparatus for transmitting and receiving a lidar signal and calculating a time of flight for reflected light pulses.

FIG. 1 illustrates an example of a lidar transceiver 100 similar to that disclosed in EP3690475A1. The lidar transceiver 100 includes sensor circuitry 104 and processing circuitry 102. The sensor circuitry 104 produces and senses detected signals corresponding to physical objects located in an operational region relative to a location of the sensor circuitry 104. The sensor circuitry 104 may include a SPAD array that senses optical signals and, in response, produces detected signals.

The sensor circuitry 104 transmits a signal in the form of a light pulse that may be reflected from physical objects within the operational region of the transmitted signals using transmitter circuitry 114. Signals reflected from the target objects are detected via receiver circuitry 116 of the sensor circuitry 104. The produced signals and received reflected signals are used to determine a time-of-flight of the signal as transmitted and reflected.

As may be appreciated, SPADs (including Geiger-mode avalanche photodiodes) are detectors capable of capturing individual photons with very high time-of-arrival resolution, typically of the order of a few tens of picoseconds. SPADs can be fabricated in dedicated semiconductor processes or in standard CMOS technologies, using known arrays of SPAD sensors, such as used in three-dimensional (3D) imaging cameras. An example of a suitable SPAD array is disclosed by Hutchings et al., in "A Reconfigurable 3-D-Stacked SPAD Imager With In-Pixel Histogramming for Flash LIDAR or High-Speed Time-of-Flight Imaging", *IEEE Journal of Solid-State Circuits* 54.11 (2019): 2947-2956.

In the example in FIG. 1, the sensor circuitry 104 includes TX front-end circuitry 114 and RX front-end circuitry 116. As further described herein, the TX front-end circuitry 114 and RX front-end circuitry 116 are used to send reference signals and detect reflected signals, for example via a TX lens 115 and a RX lens 117 respectively. The reflected signals correspond to physical objects and are used to estimate a time-of-flight for the reference signal and reflected signals that is indicative of a distance of the physical object from the sensor circuitry 104.

The apparatus 100 includes processing circuitry 102 in communication with the sensor circuitry 104. The processing circuitry 102 is used to generate a histogram using the detected signals and uses the histogram to determine or estimate distances of physical objects from the sensor circuitry 104. The processing circuitry 102 can include an array of processing circuits coupled to the SPAD array circuitry.

The processing circuitry 102 and sensor circuitry 104 may be part of an automotive lidar system. In the example of FIG. 1, The processing circuitry 102 includes a controller circuit 106, histogram circuit 112, digital signal processor 110, and storage circuit (e.g., random access memory, RAM) 108.

The controller circuit 106 sends reference or timing signals to the TX and RX front-end circuitries 114, 116 to synchronize time origins for time-of-flight estimation. The controller circuit 106 can also control histogram parameters and/or settings, e.g., bin width settings. The TX and RX front-end circuitries 114, 116 can include a variety of known front-end signal-receiving circuitry and related logic for processing of I/O signals related to the controller circuit 106. The output of RX front-end circuitry 116 is a time-of-flight record of a single detection in digital format (hereinafter time or data record). Upon detection of the signal, the histogram is updated with the new data record. The histogram circuit 112 can be used to generate and store the histogram.

The sensor circuitry 104 and the processing circuitry 102 can operate concurrently in real-time. For example, the sensor circuitry 104 produces the detected signals while the processing circuitry 102 is constructing information for the histogram. For a vehicle lidar system, the sensor circuitry 104 may operate in an autonomous, or semi-autonomous, driving mode.

Figure 2:
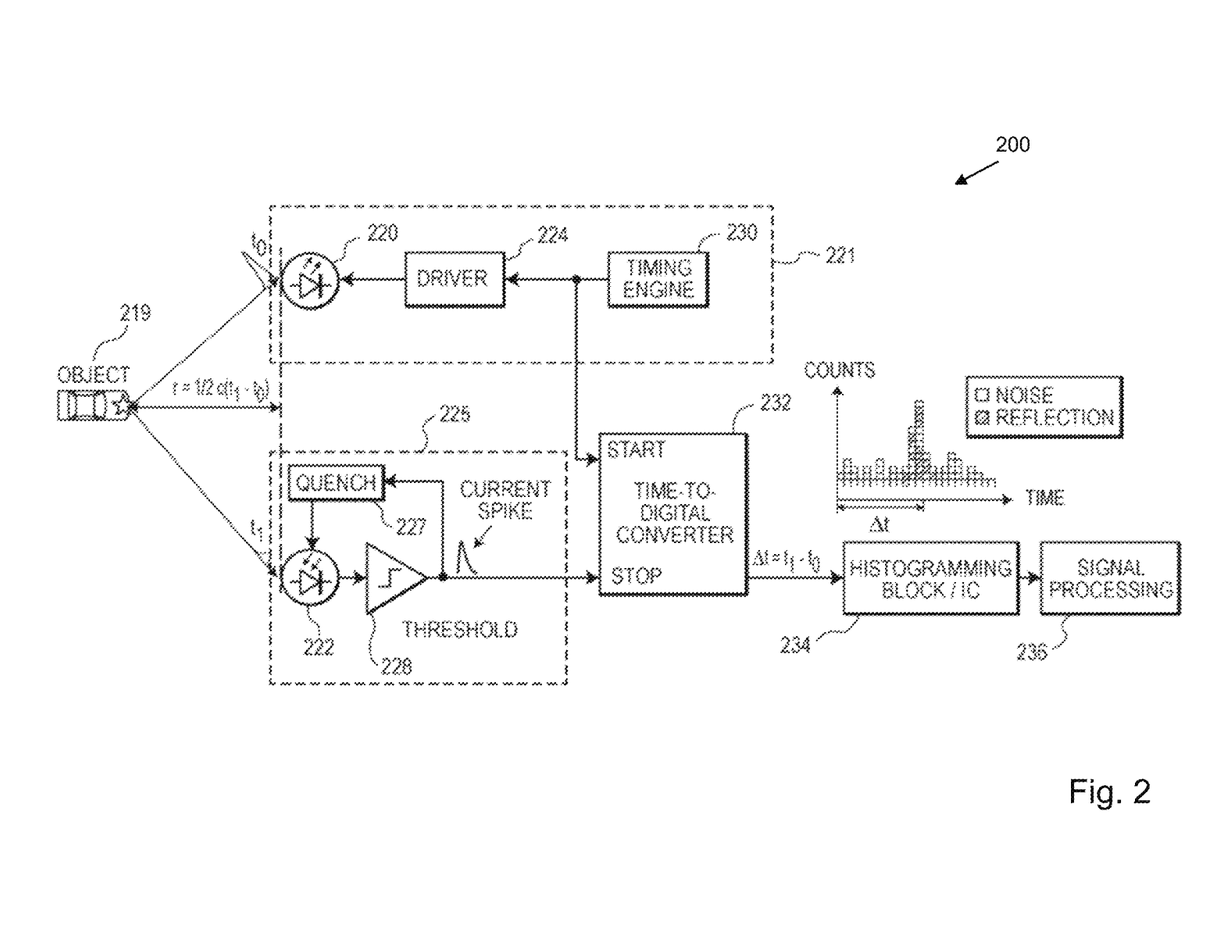
FIG. 2 illustrates an example of operation of the apparatus FIG. 1.

FIG. 2 illustrates an example of operation of the type of apparatus shown in FIG. 1. As previously described, the physical objects, e.g. object 219, can be detected using a time-of-flight technique by transmitting signals via a TX front-end circuit 221 and receiving reflected signals in response thereto via a RX back-end circuit 225. The range or distance r is calculated based on the time-of-flight $t_1-t_0$, where $t_0$ is the time at which the light signal is emitted from the emitter 220 and $t_1$ is the time at which the light signal is detected at the detector 222. Time stamping of a received signal can be made via an edge or peak using thresholding and time-to-digital converter (TDC) 232 or by use of an analog-to-digital converter (ADC) and processing (e.g., with the TDC and ADC being high speed circuits). The transmitter in FIG. 2 is an optical-signal generation circuitry 221 and the receiver is an optical-signal processing circuitry 225, together forming the sensor circuitry 104 illustrated in FIG. 1. The optical-signal generation circuitry 221 generates optical radiation, which when reflected off physical objects such as object 219. Reflections are detected by the optical-signal processing circuitry 225. Additional circuitry is configured to process signals output from the optical-signal generation circuitry 221 and the optical-signal processing circuitry 225.

The optical-signal generation circuitry 221 includes a transmitter driver 224, a timing engine 230, and a transmitter 220 that form a transmitter path (also referred to as a transmit path). Emission of optical radiation by the transmitter 220 is controlled by the transmitter driver 224 and timing engine 230 (which may form part of the controller circuit 106 in the processing circuitry 102 of FIG. 1). The transmitter 220 constitutes an illuminator such as a laser. Example illuminators include a light emitting diode, an edge-emitting laser, a vertical cavity surface emitting laser, and a known array thereof. Optical radiation emitted by the transmitter 220 travels until it is reflected by physical objects (e.g., trees, buildings, other automotive vehicles). The reflected optical radiation is sensed/received by the detector 222 of the optical-signal processing circuitry 225, at which point time-of-flight of the emitted optical radiation is determined.

The optical-signal processing circuitry 225 includes an array of single-photon avalanche diodes (SPADs) 222 and a corresponding array of threshold (level-detection) circuits 228 (as well as a quenching circuit 227 for each SPAD and threshold circuit 228). Each SPAD 222 is configured to detect the reflected optical radiation. Once detected by a SPAD 222, the optical radiation is thresholded (e.g., compared to a quiescent point by threshold circuit 228) before it is passed to additional circuitry for further processing. The sensor circuitry of the lidar system can further include a lens and a bandpass filter, which can be located in the lidar system with respect to the array of SPADs 222.

In some examples the transmitter path may include a micro-electro-mechanical system (MEMS) scanner and a MEMS driver for two-dimensional (2D) steering of a laser beam or one-dimensional (1D) steering of an array of laser beams or line-laser. In other examples, the transmitter or transmitter path may include an optical phase array and drivers for scanning a laser beam.

In yet other examples, the transmitter or the transmitter path may include a VCSEL (vertical cavity surface emitting laser) array.

The transmitter or transmitter path may include a lens system for spreading the beam into a complete field-of-view (e.g. flash) or for laser beam collimation. It can be thus be appreciated that a number of different configurations can be implemented for the transmitter or transmitter path.

The additional circuitry, which is configured to process the at least one signal output form the optical-signal generation circuitry 221 and the optical-signal processing circuitry 225, comprises a time-to-digital converter (TDC) 232, a histogram circuitry (e.g., block/IC) 234, and signal processing circuitry 236. The TDC 232 is configured to receive the detected reflected optical radiation from the optical-signal processing circuitry 225 (which is indicative of time of incidence of a single photon) as detected by the constituent SPAD array 222. Time of incidence is used to increment a count in memory of the respective incidence photon of the optical-signal processing circuitry 225 via the histogram circuitry 234 and for signal processing via the signal processing circuitry 236.

Upon detection of a reflected signal, the timing circuit (e.g., the TDC 232 illustrated in the embodiment of FIG. 2) outputs the time difference between the event and the reference/signal, referred to as measured time-of-flight record, that can be written in a time-of-flight record register or latch. The records from time-of-flight registers or latches can be read-out and passed to the histogram block for subsequent histogram generation and storage. Although the timing circuit (e.g., the TDC 232) is illustrated by FIG. 2 as being separate from the optical-signal processing circuitry 225, the timing circuit 232 may form part of the optical-signal processing circuitry 225.

The digital signal processor (e.g., signal processing circuitry 236) can be responsible for execution of algorithms for signal detection (e.g., CFAR or "Constant False Alarm Rate" detection algorithms) and for writing detected signals to RAM. A final point cloud generated from distinct reflections can be retrieved from RAM. Processing by the digital signal processor may extend beyond signal detection including but not limited to: subsequent point-cloud filtering, segmentation, object classification, and state estimation.

A storage circuit, such as the storage circuit 108 depicted in FIG. 1, can be configured to store respective counts of the photons that arrive in a plurality of different time bins. While obtaining the measurements, the memory that is associated with the optical-signal processing circuitry 225 stores respective counts of the photons that arrive at the processing circuitry in multiple different time bins, which span the detection window that the transmitter driver 224 and timing engine 230 set for the optical-signal processing circuitry 225. A controller can process a histogram of the respective counts over the different bins for the sensing circuitry so as to derive and output a respective time-of-arrival value for the optical-signal processing circuitry 225.

As may be appreciated, embodiments are not to be limited to use of a TDC and can include apparatuses having an analog-to-digital converter (ADC). For example, the detected reflected optical radiation is provided to the ADC via a correlated double sampling (CDS) circuit that receives the detected signal from the optical-signal processing circuitry 225 and outputs a sampled signal whose voltage is proportional to the detected time-of-arrival of the photon to the ADC. For general and specific information related to estimating time-of-flight and specific information on use of TDCs or ADCs, reference is made to U.S. Pat. No. 9,502,458 US Publication No. 2017/0052065 A1.

Figure 3A:
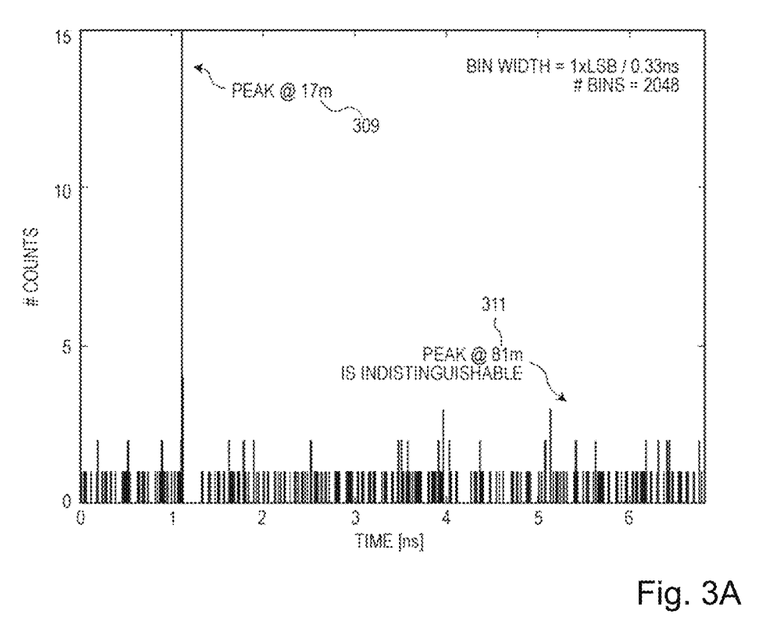
FIGS. 3A-3C illustrate examples of histograms with different bin widths.
Figure 3B:
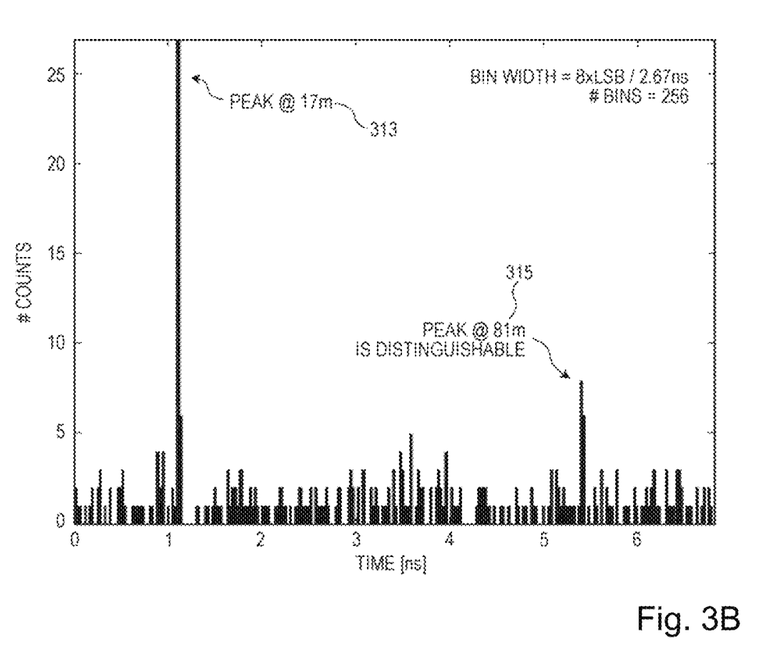
Figure 3C:
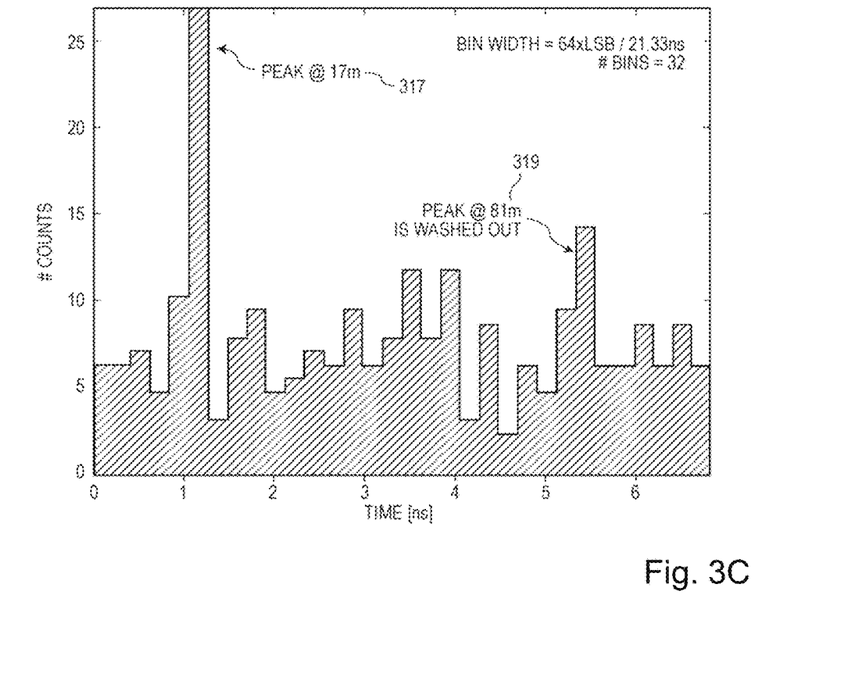

FIGS. 3A-3C illustrate examples of histograms with different bin widths, each histogram having bins of equal width over the operational region corresponding to an acquisition time period. A TDC resolution of 333 ps may be assumed in these examples (e.g., LSB in each case corresponding to 333 ps). As is illustrated by FIG. 3A, in a histogram with bin width of 1×LSB (e.g., bin width 1×LSB/ 0.33 ns and having 2048 bins), a strong signal from a physical object at 17 m results in a distinct peak 309, while a weaker signal from another physical object at 81 m is indistinguishable, as indicated by 311. As illustrated by FIG. 3B, in a histogram with bin width of 8×LSB (e.g., bin width 8×LSB/2.67 ns and having 256 bins) both peaks at 17 m and at 81 m are distinguishable, as illustrated respectively by 313 and 315. A possible disadvantage (depending on the application and specific embodiment) of 8×LSB bin width is the loss of the range resolution, being 40 cm for 256 bins as against 5 cm for 2048 bins. A 40 cm range resolution, depending on the use-case, may be sufficient for the other physical objects at 81 m (e.g., as illustrated by 315) but not for the physical object at 17 m (e.g., as illustrated by 313). FIG. 3C, in which bin width is set to 64×LSB (e.g., bin width 64×LSB/21.33 ns and having 32 bins), demonstrates a different side effect at the other extreme: if bin width is set too wide, a weak signal is washed out with noise, as illustrated by 319 (e.g., peak at 81 m) as compared to 317 (e.g., peak at 17 m).

The trade-off between resolution for strong signals and detection reliability for weak signals is signal power and the resulting respective cumulative photon distribution. Due to the blocking nature of SPAD array circuitry, in which earlier photons block later ones due to device quenching and subsequent dead-time, different signal shapes than expected may exist in the resulting histogram. A strong signal saturates the SPAD array circuitry almost instantaneously, while a weak signal requires a longer integration time for the SPAD array circuitry to become saturated.

Figure 4A:
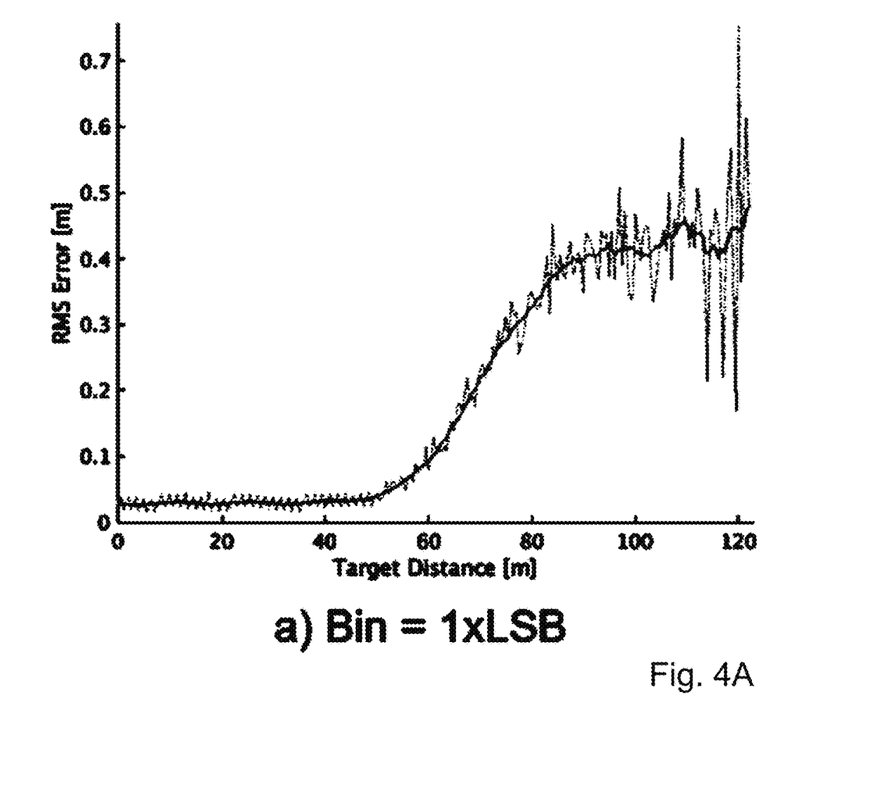
FIGS. 4A-4C illustrate examples of RMS error as a function of target distance using histograms of different bin widths.
Figure 4B:
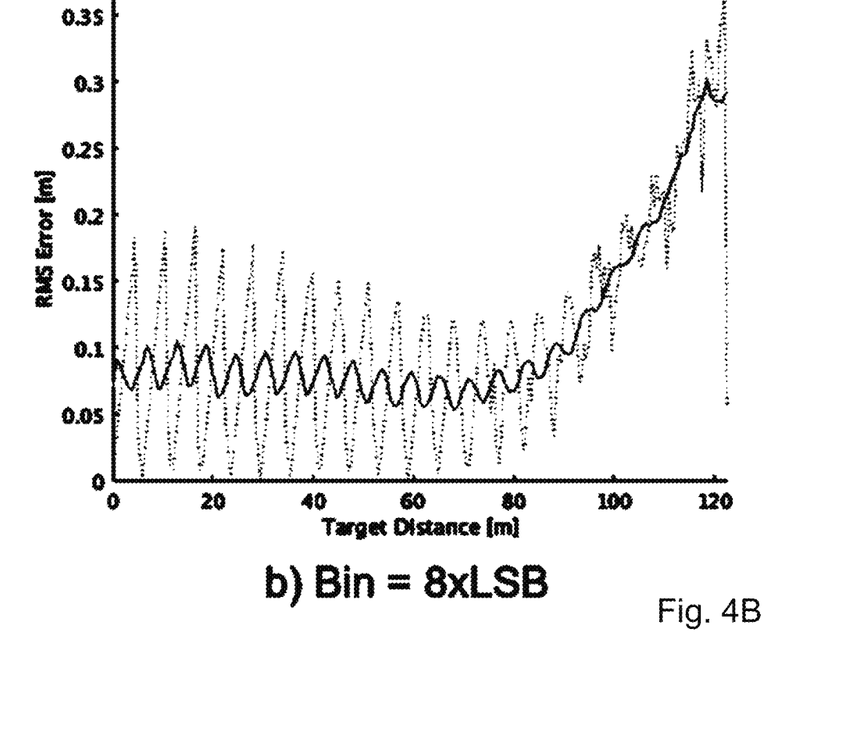
Figure 4C:
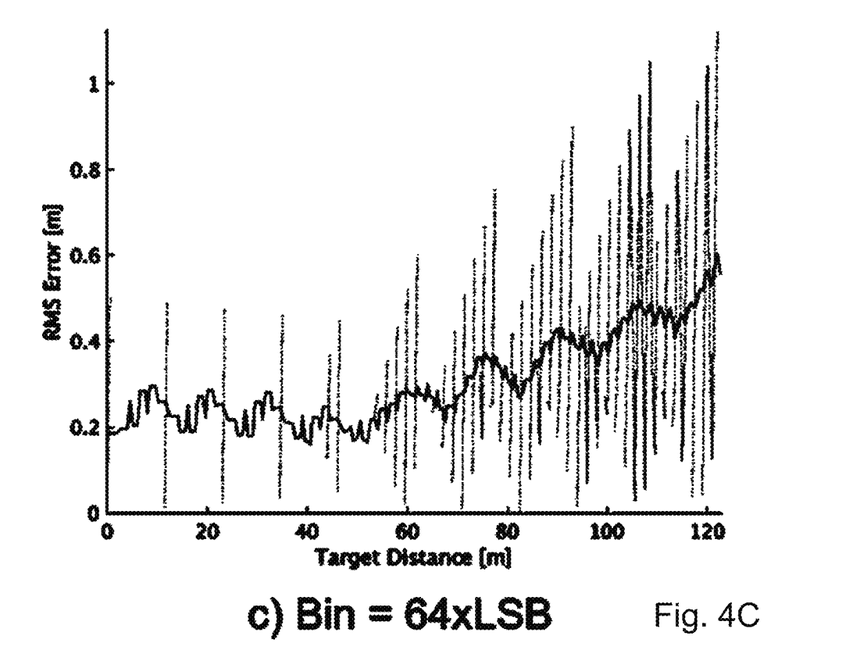

The effect of range resolution due to the increase of the bin widths is shown in FIGS. 4A-4C, in which the RMS distance error is plotted as a function of target distance for different size bins, with FIG. 4A showing results for bins of 1×LSB, FIG. 4B bins of 8×LSB and FIG. 4C bins of 64×LSB. In each case, the error (dotted line) is shown along with a moving mean value (solid line). The smallest errors are shown for the smallest bin size, as would be expected, together with the highest stability over the range detected. Wider bin widths of 8×LSB or 64×LSB suffer from higher errors as well as sampling errors, which can be seen in the saw-tooth shape of each plot. The accuracy also worsens as the signal becomes weaker with higher target distances, such as it is the case when a target recedes from a lidar based on a SPAD detector.

One solution to the above problems is to implement adaptive histograms, in which the bin width is adapted as a function of target distance, as disclosed in EP3690475A1. This can result in a reduced memory requirement by using wider bins for smaller target distances where the percentage accuracy is acceptable, while using narrower bins for higher target distances. A problem with this, however, is that the memory requirements are still substantial and the issue of using smaller bins for higher target distances where peaks may become indistinguishable, as shown in FIG. 3A, remains.

Figure 5:
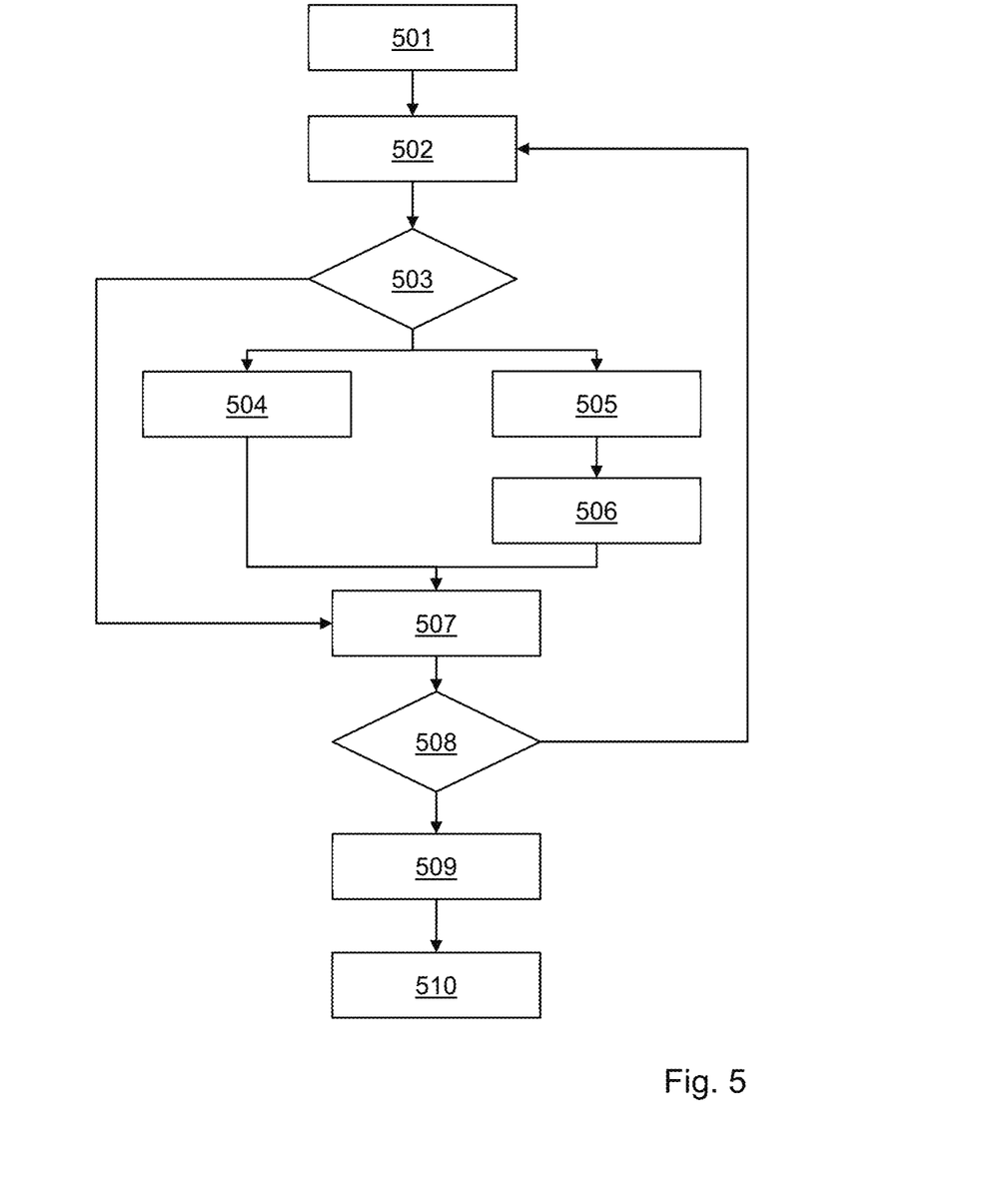
FIG. 5 is a schematic flow chart illustrating an example method of calculating time of flight of a lidar signal.

FIG. 5 illustrates an example method of calculating time of flight of a lidar signal, as carried out by a lidar transceiver having a transmitter, receiver and processor. In a first step 501, a histogram is defined in terms of a number of bins, each having a defined width, the histogram covering an acquisition time period with a plurality of first bins for recording photon counts at each of a plurality of time portions over the acquisition time period and a corresponding plurality of second bins for recording a cumulative time difference between an arrival time of a photon and a reference point of the time portion. In a second step 502, an acquisition time period is started and a light pulse is transmitted by the transmitter. The light pulse travels to any objects in a line of sight of the transmitter and photons are reflected back to the receiver.

If a photon is received (step 503), two processes occur for each time portion. If a photon is not received, the process proceeds to step 507. In a first process, at step 504 the histogram is updated by adding a photon count to a bin corresponding to the time portion in which the photon is received. In a second process, which may occur in parallel with the first process, a time of arrival of the photon is recorded and a time difference calculated between a reference point of the time portion and the time of arrival. This time difference is added to a cumulative total stored in a second bin corresponding to the time portion (step 506). At step 507, a count of light pulses is incremented and, if the count has not yet reached a predetermined number of light pulses (step 508), the process starting from step 502 repeats. Once the predetermined number of pulses has been reached, at step 509 the resulting histogram is analysed to determine a peak from the photon counts in the first bins. For the peak identified in step 509, at step 510 a time of flight is estimated based on the reference point of the time portion covered by the first bin and the cumulative time difference in the second bin.

This method of calculating time of flight solves the above-mentioned problems by taking into account the distribution of photon events within a single bin or a number of bins by considering a timestamp relative to a reference point set. The range estimation achieved considers the effect of the sum of timestamps relative to the reference point to determine the point, within the bin, of the highest concentration of photon events. This in turn corresponds to the position of the target, given the fact that the total contribution from external (sunlight) and internal noise (so called dark count rate) to inter-bin cumulative delta or phase value will tend to cancel out, as the noise within a single laser shot is largely uniform.

Figure 6A:
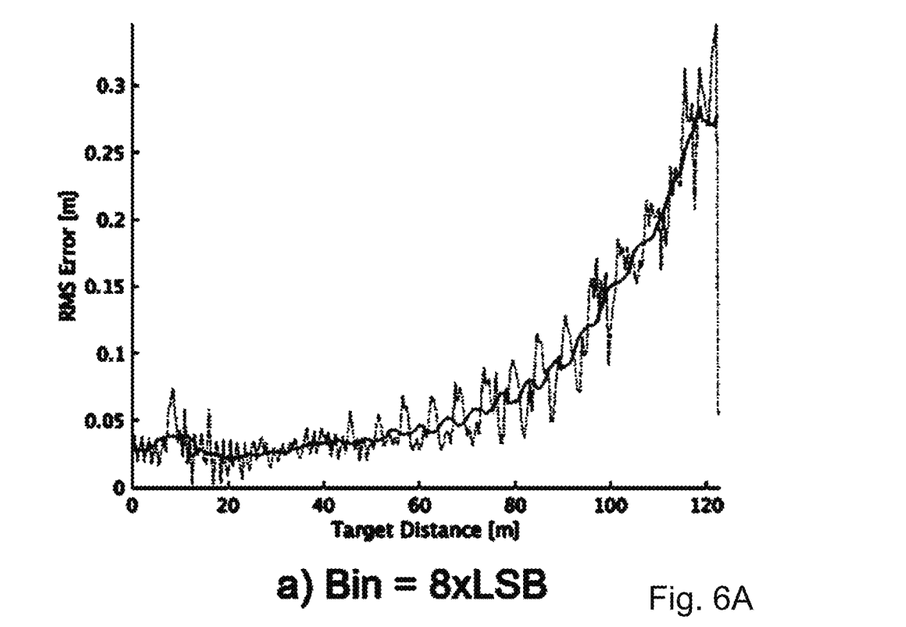
FIGS. 6A and 6B illustrate plots of RMS error as a function of target distance for example histograms of 8 and 64×LSB bin widths using the method described herein.
Figure 6B:
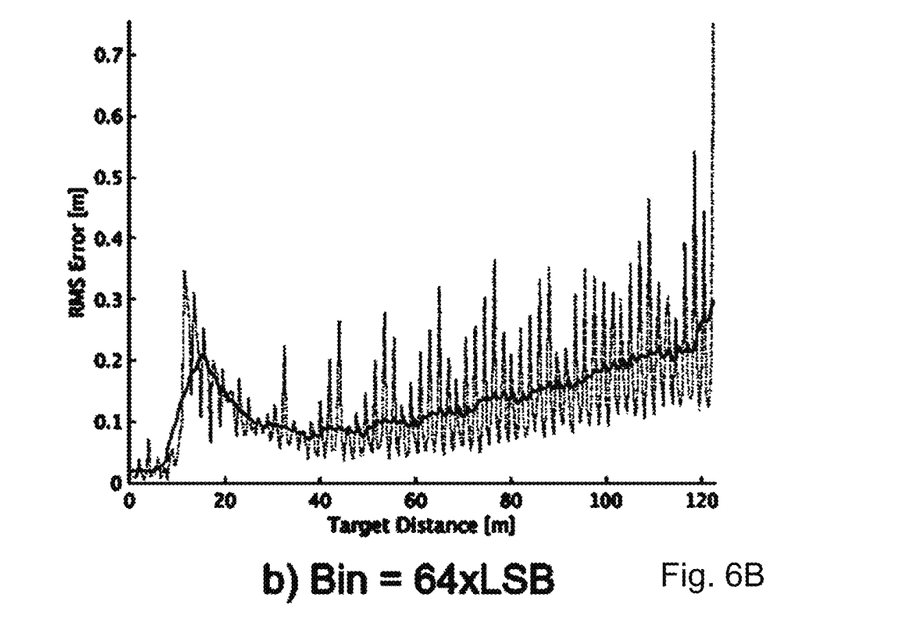

With improved range detection via inter-bin cumulative delta or phase value estimation, the accuracy of histogram bin-width of 8×LSB not only reaches but exceeds that of traditional histogram-based approach with bin-width of 1×LSB and 8×LSB. This is shown in FIGS. 6A and 6B, which illustrate RMS error as a function of target distance for 8×LSB bins and 64×LSB bins respectively. For 8×LSB bins the RMS error ranges from below 5 cm up to around 60 m, rising to around 30 cm for a target distance of 120 m, while the sampling errors are much reduced compared with the corresponding example shown in FIG. 4B. For 64×LSB bins, the RMS error is consistently higher, generally between around 10-30 cm for target distances above around 10 m, but this is lower than most of the range shown in FIG. 4C and again the sampling errors are much reduced.

The sampling errors are overcome because the range-detection is not based on merely histogram peak detection. At the same time, sensitivity corresponds roughly to the sensitivity of a traditional histogram-based approach of the same bin-width, i.e. higher that of 1×LSB (as a higher portion of a weak signal is integrated into a single bin, as demonstrated in FIG. 3B).

Depending on the position of the reference point for the time portion represented by each bin, the timestamp relative to the reference point will vary. Selection of broader bin widths allows for the obtention of greater magnitudes for the timestamps relative to the reference point within a single bin.

The memory requirements for the method are substantially lower for the same accuracy and range resolution. Comparing a traditional histogram-based approach of 1×LSB bin-width with that disclosed herein based on intra-bin cumulative delta or phase value estimation of 8×LSB bin-width, range-accuracy is similar or better. Assuming a maximum bin count of 256 or 8 bits for 1×LSB, for a traditional approach the memory requirement would be 4096×8b=32 kb. For the method described herein, assuming an intra-bin cumulative delta value for every bin and estimation relative to the bin middle, a maximum bin count would correspond to (256×8) or 12 bits for 8×LSB and a maximum delta value, being the maximum bin count multiplied by the maximum possible distance to the middle, i.e. 4 or 3 bits, the memory requirement would be 512×(12b+15b)=13 kb. The memory requirement is thereby reduced by factor of 2.3 for a similar accuracy. The memory requirements may be further reduced by sharing intra-bin cumulative delta or phase-values between multiple pixels or a complete histogram. Also, the maximum count is capped by the number of measurement cycles and could be lower than 12 bits.

Equation 1 below shows an example of how the inter-bin cumulative delta or phase value may be calculated. The result is then used in signal processing, together with the histogram analysis, to determine the range estimation of the target position. In this case $\Delta$ refers to the different timestamp relative to the reference point, while $H_i$ corresponds to the photon detection count stored at the histogram bin under analysis and $_{Noise})$ represents the noise level from the surroundings of the histogram bin under analysis or the complete histogram. The approximation for the noise can be achieved, for example, by computing the mean or the median of the neighbouring histogram bins on both sides of the histogram bin of interest. \x\to(H $$\Delta_{final} = \frac{\sum \Delta}{H_i - H_{noise}} \quad (1)$$

In a general aspect therefore, the time of flight may be estimated from the cumulative total of the calculated time difference, $\Sigma\Delta$ for the time portion of the histogram containing the identified peak. This may be done by dividing the cumulative total of the calculated time difference by the cumulative count of photons, $H_i$, received during the time portion. A measure of noise, $_{Noise})$, may be subtracted from the cumulative count of photons, $H_i$. It is important to note that the formula presented in equation 1, is just one of the many principles approaches that could be considered when using inter-bin delta.\x\to(H It should be appreciated that gathering more data, such as second central moment of timestamps, may provide more useful information about the signal, e.g. material or relative orientation, while keeping memory requirements lower than of a full histogram.

From reading the present disclosure, other variations and modifications will be apparent to the skilled person. Such variations and modifications may involve equivalent and other features which are already known in the art of lidar systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of calculating time of flight of a lidar signal, the method comprising:
   i) transmitting a light pulse to start an acquisition time period having a plurality of successive time portions;
   ii) for each successive time portion, if a photon is received:
   iia) recording a time at which the photon is received;
   iib) updating a histogram to record a cumulative count of photons received during the time portion by subtracting a measure of noise from the cumulative count of photons received during the time portion;
   iic) calculating a time difference between the time at which the photon is received relative to a reference point of the time portion, wherein the reference point is greater than zero;
   iid) updating a cumulative total of the calculated time difference for the time portion;
   iii) repeating steps i) to iid) for a succession of N transmitted light pulses;
   iv) identifying a peak in a time portion of the histogram; and
   v) estimating a time of flight from the cumulative total of the calculated time difference for the time portion of the histogram containing the identified peak.

2. The method of claim 1, wherein the cumulative total of the calculated time difference is combined for multiple time portions over the acquisition time period.

3. The method of claim 1, wherein the reference point of the time portion is at a mid point of the time portion.

4. The method of claim 1, wherein the time of flight, t, for the identified peak is calculated from:

$$t = t_r + \frac{\sum \Delta}{H_i - \overline{H_{noise}}}$$

where $t_r$ is a time from the start of the acquisition time period corresponding to reference point of the time portion, $\Sigma\Delta$ is the cumulative total of the calculated time difference, $H_i$ is the cumulative count of photons and $\overline{H_{Noise}}$ is a measure of noise in the histogram.

5. The method of claim 4, wherein $\overline{H_{Noise}}$ is calculated from an average of photon counts across the histogram other than the time portion containing the peak.

6. A lidar transceiver comprising:
   a transmitter configured to transmit light pulses;
   a receiver configured to receive reflected photons from the light pulses transmitted by the transmitter; and
   processing circuitry connected to the transmitter and receiver, the processing circuitry configured to:
   i) start an acquisition time period by causing the transmitter to transmit a light pulse;
   ii) for a plurality of successive time portions in the acquisition time period, if a photon is received:
   iia) record a time at which the photon is received;
   iib) update a histogram to record a cumulative count of photons received by the receiver during the time portion by subtracting a measure of noise from the cumulative count of photons received during the time portion containing the identified peak;
   iic) calculate a time difference between the time at which the photon is received relative to a reference point of the time portion, wherein the reference point is greater than zero;
   iid) update a cumulative total of the calculated time difference for the time portion;
   iii) repeat steps i) to iid) for a succession of N transmitted light pulses;
   iv) identify a peak in a time portion of the histogram; and
   v) estimate a time of flight from the cumulative total of the calculated time difference for the time portion of the histogram containing the identified peak.

7. The lidar transceiver of claim 6, wherein the cumulative total of the calculated time difference is combined for multiple time portions over the acquisition time period.

8. The lidar transceiver of claim 6, wherein the receiver comprises a single photon avalanche diode, SPAD.

9. The lidar transceiver of claim 6, wherein the receiver comprises an array of SPADs, the processing circuitry being configured to perform steps i) to v) for each SPAD in the array in parallel.

10. The lidar transceiver of claim 6, wherein the processing circuitry is further configured to estimate the time of flight comprising applying the cumulative total of the calculated time difference to the reference point of the portion of the histogram containing the identified peak by dividing the cumulative total of the calculated time difference by the cumulative count of photons received during the time portion containing the identified peak.

11. The lidar transceiver of claim 6, wherein the reference point of the time portion is at a mid point of the time portion.

12. A lidar transceiver comprising:
   sensor circuitry comprising:
      a transmitter configured to transmit light pulses;
      a receiver including a single photon avalanche diode (SPAD) configured to receive reflected photons from the light pulses transmitted by the transmitter; and
   processing circuitry connected to the sensor circuitry, the processing circuitry configured to:
   i) start an acquisition time period by causing the transmitter to transmit a light pulse;
   ii) for a plurality of successive time portions in the acquisition time period, if a photon is received:
   iia) record a time at which the photon is received;
   iib) update a histogram to record a cumulative count of photons received by the receiver during the time portion by subtracting a measure of noise from the cumulative count of photons received during the time portion containing the identified peak;
   iic) calculate a time difference between the time at which the photon is received relative to a reference point of the time portion, wherein the reference point is greater than zero;
   iid) update a cumulative total of the calculated time difference for the time portion;
   iii) repeat steps i) to iid) for a succession of N transmitted light pulses;
   iv) identify a peak in a time portion of the histogram; and
   v) estimate a time of flight from the cumulative total of the calculated time difference for the time portion of the histogram containing the identified peak.

13. The lidar transceiver of claim 12, wherein the cumulative total of the calculated time difference is combined for multiple time portions over the acquisition time period.

14. The lidar transceiver of claim 12, wherein the reference point of the time portion is at a mid point of the time portion.

15. The lidar transceiver of claim 12, wherein the receiver comprises an array of SPADs, the processing circuitry being configured to perform steps i) to v) for each SPAD in the array in parallel.

16. The lidar transceiver of claim 12, wherein the processing circuitry is further configured to estimate the time of flight comprising applying the cumulative total of the calculated time difference to the reference point of the portion of the histogram containing the identified peak by dividing the cumulative total of the calculated time difference by the cumulative count of photons received during the time portion containing the identified peak.

17. The lidar transceiver of claim 12, wherein the processing circuitry is further configured to subtract a measure of noise from the cumulative count of photons received during the time portion containing the identified peak.

\* \* \* \* \*